(12) United States Patent
Painter et al.

(10) Patent No.: US 8,979,986 B2
(45) Date of Patent: Mar. 17, 2015

(54) METHOD AND APPARATUS FOR MEASURING ASH DEPOSIT LEVELS IN A PARTICULATE FILTER

(75) Inventors: David Painter, Bradford, IL (US); Steven F. Meister, Chillicothe, IL (US); Michael C. Gatz, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 412 days.

(21) Appl. No.: 13/335,061

(22) Filed: Dec. 22, 2011

(65) Prior Publication Data
US 2012/0234169 A1    Sep. 20, 2012

Related U.S. Application Data

(60) Provisional application No. 61/426,588, filed on Dec. 23, 2010.

(51) Int. Cl.
| B01D 46/00 | (2006.01) |
| F01N 9/00 | (2006.01) |
| F01N 3/021 | (2006.01) |

(52) U.S. Cl.
CPC ............ F01N 9/002 (2013.01); B01D 46/0086 (2013.01); F01N 3/021 (2013.01); F01N 2560/12 (2013.01); F01N 2900/1611 (2013.01); Y02T 10/20 (2013.01); Y02T 10/47 (2013.01)
USPC ................. 96/417; 96/423; 95/25; 356/614

(58) Field of Classification Search
USPC ........................ 55/25; 356/614; 96/417, 423
See application file for complete search history.

(56) References Cited

U.S. PATENT DOCUMENTS

| 4,130,018 | A | * | 12/1978 | Adams et al. ............... 73/290 V |
| 5,184,510 | A | * | 2/1993 | Rossman ..................... 73/290 V |
| 5,235,416 | A | * | 8/1993 | Stanhope ......................... 348/77 |
| 7,444,178 | B2 | * | 10/2008 | Goldbach ..................... 600/427 |
| 7,450,250 | B2 | * | 11/2008 | Venkatesh et al. ............ 356/620 |
| 7,548,272 | B2 | * | 6/2009 | Perlman et al. ............... 348/371 |
| 7,698,945 | B2 | | 4/2010 | Fei et al. |
| 8,243,288 | B2 | * | 8/2012 | Taguchi ......................... 356/614 |
| 8,394,036 | B2 | * | 3/2013 | Kozak ........................... 600/587 |
| 2007/0163233 | A1 | | 7/2007 | Cheng |
| 2008/0048681 | A1 | | 2/2008 | Birkhofer et al. |
| 2010/0231692 | A1 | * | 9/2010 | Perlman et al. ................. 348/48 |
| 2013/0066195 | A1 | * | 3/2013 | Sirimanne et al. ............ 600/424 |
| 2013/0181134 | A1 | * | 7/2013 | Forster ....................... 250/341.6 |

FOREIGN PATENT DOCUMENTS

JP    2002357140 A    12/2002

\* cited by examiner

*Primary Examiner* — Robert Clemente
(74) *Attorney, Agent, or Firm* — Miller, Matthias & Hull LLP

(57) ABSTRACT

The present disclosure provides a method and apparatus for measuring ash deposit levels in a particulate filter comprising at least one cell. One or more indicator components is inserted into the at least one cell so as to lie upon any deposits contained therein. Radiation is emitted from a radiation source into the cell, and the position of the one or more indicator components is detected on the basis of the emitted radiation. The deposit level within the cell is then calculated on the basis of the position of the one or more indicator components.

12 Claims, 4 Drawing Sheets

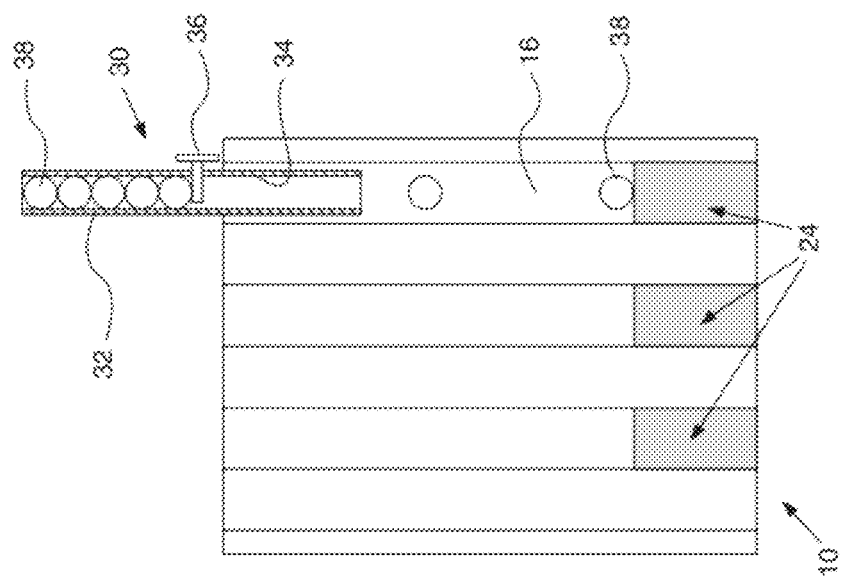
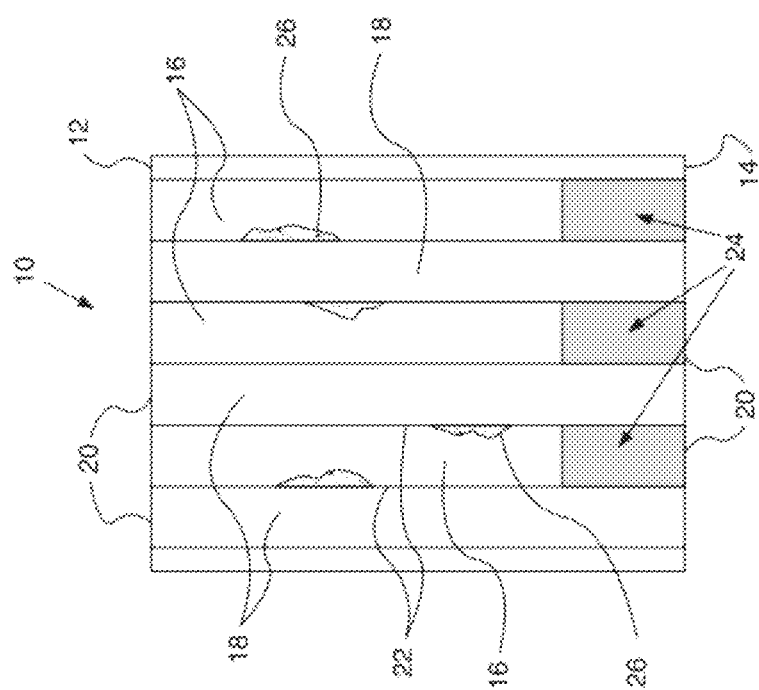

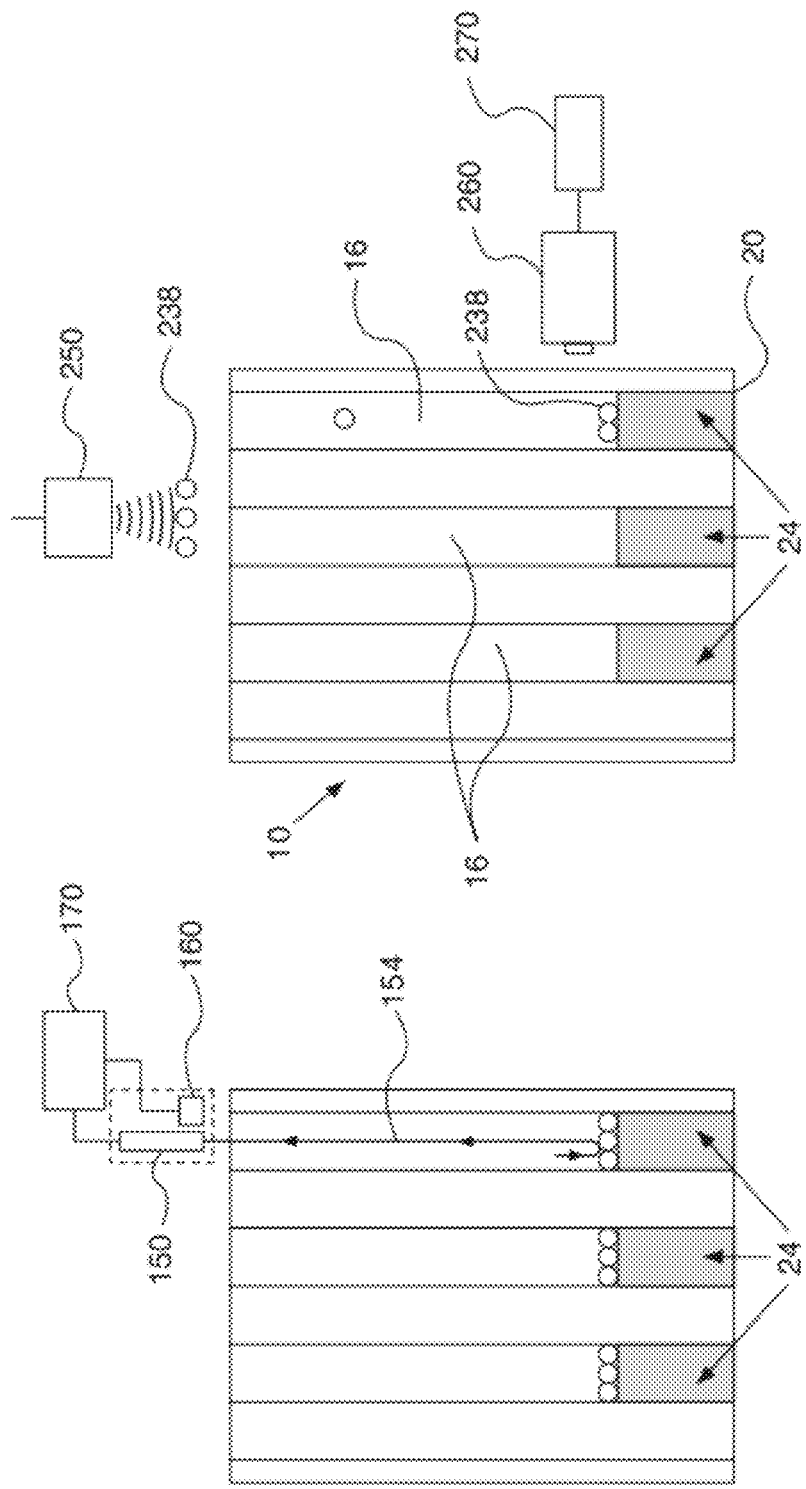

METHOD AND APPARATUS FOR MEASURING ASH DEPOSIT LEVELS IN A PARTICULATE FILTER

RELATED APPLICATIONS

This application is based upon, claims priority to, and otherwise claims the benefit of U.S. Provisional Application No. 61/426,588 by Michael C. Gatz et al., filed Dec. 23, 2010, the contents of which are expressly incorporated herein by reference.

TECHNICAL FIELD

The invention relates to the field of particulate filters, and in particular the invention relates to diesel particulate filters used in internal combustion engines. More specifically, the invention relates to a method and apparatus of measuring ash deposit levels in such filters.

BACKGROUND OF THE INVENTION

Particulate filters are used in internal combustion engines, and especially diesel engines, to capture soot or ash present in the exhaust gas of the engine. The filters typically comprise a number of elongate cells which are generally aligned with the direction of the flow of exhaust gas when the filter is in use. The cells are open at one end and closed at the other end so that the gas may flow through and out of the cells but the soot and ash will be captured on the cell walls and remain in the filter. Adjacent cells usually face in opposing directions, with one cell open to the exhaust inlet side of the filter and the adjacent cell open to the exhaust outlet side of the filter.

In order to maintain their filtration performance some diesel particulate filters have a degree of autoselective regeneration, where the filter is regularly cleaned automatically whilst still in place within the exhaust system. There are numerous filter regeneration methods such as, for example, electrical discharge regeneration or gas discharge regeneration using nitrogen oxide. Whilst the regeneration of the filter in situ removes the majority of the soot captured in the filter cells, the performance of the filter will still diminish over a period of prolonged use, since the ash component in the filter is not reducible with regeneration. It is therefore important for the filter to be removed and cleaned as part of regular engine servicing procedures. It is equally important that a proper inspection of the cleaned filter is then carried out before the filter is put back into service, otherwise the filter performance may diminish to an undesirable level before the next scheduled engine service is reached.

Given the relatively small diameter of the cells in the filter it is difficult to access the cells and carry out a proper inspection. One invasive inspection technique uses a borescope to view the interior of each cell in order to determine cleanliness. However, borescopes are expensive and also require servicing personnel to be trained in order to operate them properly. Alternative, non-invasive inspection methods have also been devised. One such method is to measure the air pressure drop across the cleaned filter and compare it to a base value for a brand new filter. However, given the extremely low density of the ash particles it is very difficult to accurately establish whether deposits remain in the cleaned filter using this method. Another non-invasive method uses ultrasound waves which are directed into the filter cells and then a reading is taken of the waves reflected from the ash deposits lying in the cells. However, as the ash in the cells does not reflect the ultrasound waves well, the resultant ultrasound image presented to the user is usually unclear and unhelpful in determining whether ash is still present in the cleaned filter or not. In addition, ash which sticks to the longitudinal walls of the cells tends to disrupt the signal reflected from the main deposit against the end wall, which again presents an unclear image to the operator.

SUMMARY OF THE INVENTION

According to a first aspect of the disclosure there is provided a method of measuring ash deposit levels in a particulate filter comprising at least one cell. The method comprises inserting one or more indicator components into the at least one cell so as to lie upon any deposits contained therein. Radiation is emitted from a radiation source into the cell, and the position of the one or more indicator components is detected on the basis of the emitted radiation. The deposit level within the cell is then calculated on the basis of the position of the one or more indicator components.

According to a second aspect of the disclosure there is provided a method of cleaning a particulate filter having at least one cell. The method comprises removing deposits contained in the at least one cell, and then inserting one or more indicator components into the at least one cell so as to lie upon any deposits contained therein. Radiation is emitted from a radiation source into the cell, and the position of the one or more indicator components is detected on the basis of the emitted radiation. The deposit level within the cell is then calculated on the basis of the position of the one or more indicator components. The one or more reflective components and any remaining deposits are then removed from the cell.

According to a third aspect of the disclosure there is provided an apparatus for measuring ash deposit levels in a particulate filter comprising at least one cell. The apparatus comprises a radiation source for emitting radiation into the at least one cell, and one or more indicator components insertable into the at least one cell. The apparatus further comprises at least one radiation detection sensor which detects the position of the one or more indicator components on the basis of the emitted radiation, and a processor which calculates an ash deposit level on the basis of the reflected radiation.

BRIEF DESCRIPTION OF THE DRAWINGS

Preferred embodiments of the disclosure will now be described, by way of example only, with reference to the accompanying drawings.

FIG. 1 shows a vertical cross section through a schematic representation of a particulate filter;

FIGS. 2-4 show a first embodiment of the disclosure, in which:

FIG. 2 shows reflective components being inserted into the filter of FIG. 1;

FIG. 3 shows ultrasound waves being emitted in the direction of the reflective components in the filter; and FIG. 4 shows the ultrasound waves being reflected back from the reflective components to a receiver.

FIGS. 5-7 show a second embodiment of the disclosure in which:

FIG. 5 shows reflective components being inserted into the filter of FIG. 1;

FIG. 6 shows a beam of light being emitted in the direction of the reflective components in the filter; and FIG. 7 shows the beam of light being reflected back from the reflective components to a receiver.

FIG. 8 shows a third embodiment of the disclosure.

DETAILED DESCRIPTION OF THE DRAWINGS

Figure 3:
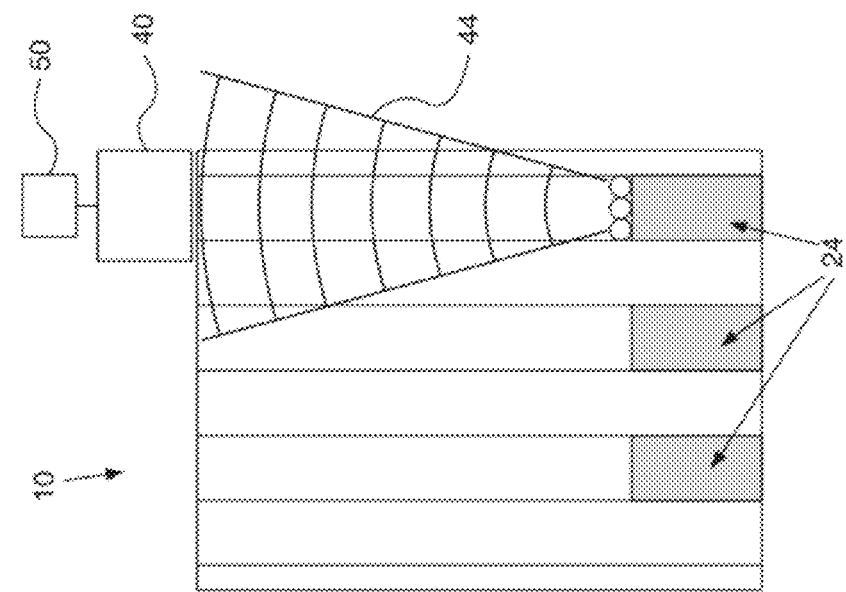

As stated above, the figures show three embodiments of the disclosure in which a particulate filter is shown schematically by way of a vertical section view. The filter shown in the figures comprises six cells for illustrative purposes, but it will be appreciated that the filter may comprise one or more cells as desired.

FIG. 1 shows a particulate filter 10 for the exhaust system of an internal combustion engine after it has undergone a cleaning procedure during engine maintenance. The filter 10 may be formed from a porous ceramic material and comprises a number of elongate cells which are open at one end and closed at the other. The filter 10 has an exhaust inlet side 12 and an exhaust outlet side 14. The cells are divided into inlet cells 16 which are open on the exhaust inlet side 12 of the filter 10, and outlet cells 18 which are open on the exhaust outlet side 14 of the filter 10. The inlet and outlet cells 16,18 alternate across the filter 10, such that each pair of adjacent cells 16,18 are open on opposing sides of the filter 10. The closed ends of each cell are closed off by an end wall 20 which is integrally formed with the elongate side walls 22 which separate the inlet and outlet cells 16,18 from one another. Alternatively, the filter may be formed such that each cells is open at either end, and one end may then be closed by plugs (not shown) which are inserted into an open end of every second cell.

In FIG. 1 it can be seen that despite the filter having been cleaned, ash deposits 24 remain in the bottom of the inlet cells 16. In addition, ash deposits 26 are also still present on the side walls 22 of the cells 16. If the filter were to be returned to operational use in this state it would become overloaded with ash quicker than expected, and most likely some time before it was due to be cleaned again.

Figure 4:
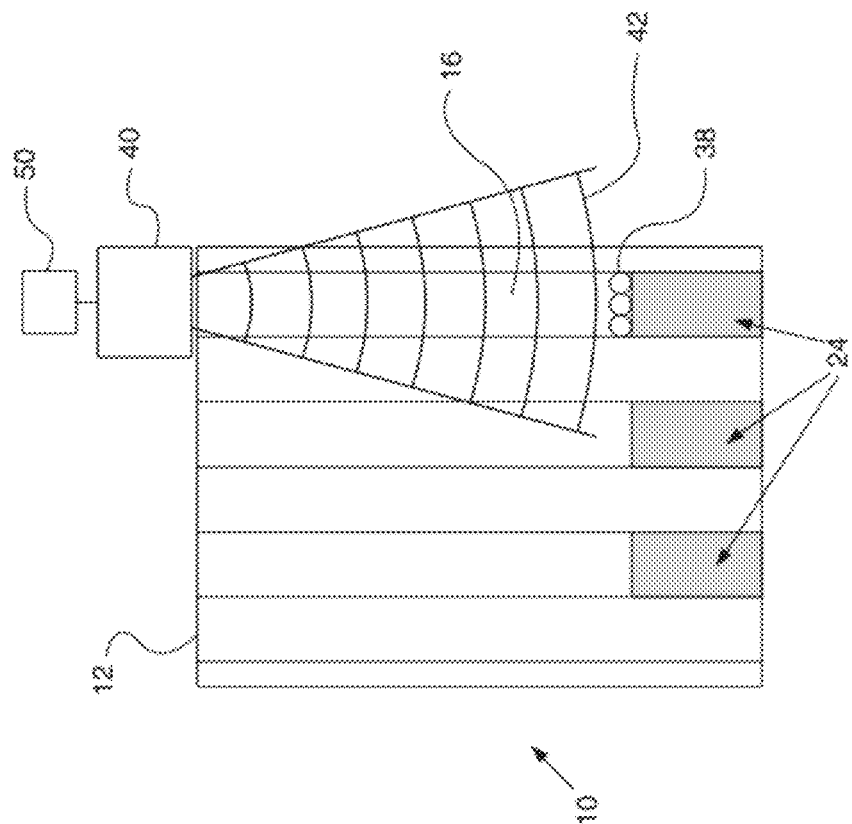

FIGS. 2 to 4 show a first embodiment of an apparatus for measuring ash deposit levels in a particulate filter comprising at least one filter cell. FIG. 2 shows reflective indicator components being inserted into an inlet cell 16 of the filter 10 in order to measure the level of ash deposits remaining in the cell 16. The reflective components may simply be inserted or dropped into the cell 16 by hand or, as shown here in FIG. 2, a dedicated dispenser 30 may be employed for the purpose. The dispenser 30 comprises an elongate tubular body 32 having an internal dispensing passage 34. A release member 36 is at least partially located within the passage 34 and is selectively moveable between a first position in which the reflective components are held in the passage 34 (the position shown in FIG. 2) and a second position in which one or more of the reflective components are released from the dispenser 30.

By "reflective" it is meant that the components are capable of reflecting light, sound, or other forms of energy. The reflective components may take a number of forms such as, for example, metallic flakes. However, in the illustrated embodiments shown the reflective components are reflective balls 38. The balls are formed from a reflective material or alternatively may have a reflective coating applied to their exterior surface. They may be solid but may alternatively be hollow depending on operational requirements. Whether solid or hollow, the balls 38 may have a diameter in the range 0.6 mm to 1.4 mm.

FIG. 3 schematically illustrates a first radiation source which emits radiation in order to locate the reflective balls 38 inserted into the inlet cell 16 and now lying upon the ash deposits 24 in the bottom of the cell 16. The term "radiation" is used in this specification to refer to energy emitted from a source in the form of rays or waves such as heat, light or sound, for example. In this first illustrated embodiment, the radiation emitted is in the form of sound waves wherein the radiation source is an ultrasonic sensor or transceiver 40. The sensor 40 emits ultrasound waves 42 towards the reflective balls 38 within the cell 16. A processor 50 is connected to the sensor 40 in order to calculate the deposit level within the cell 16 based on reflected sound waves 44 detected by the sensor 40.

Figure 5:
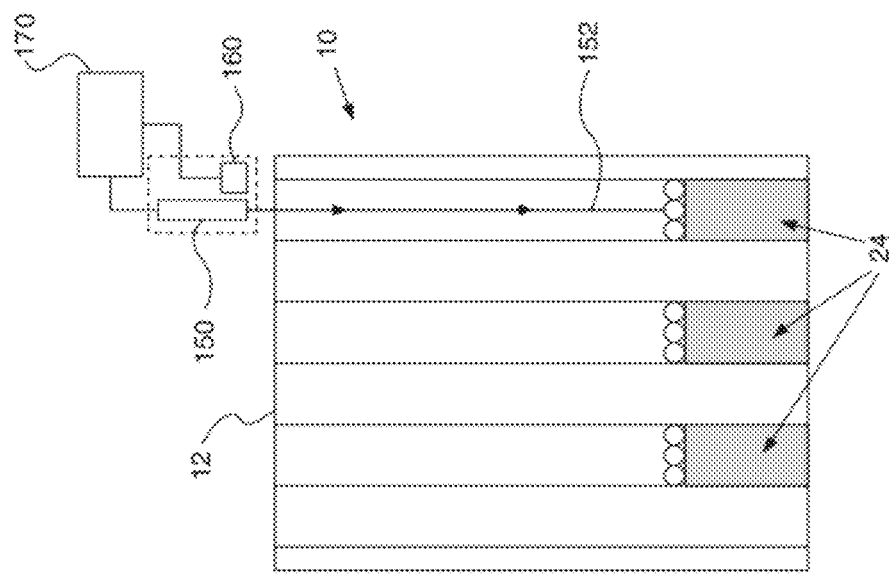
Figure 6:
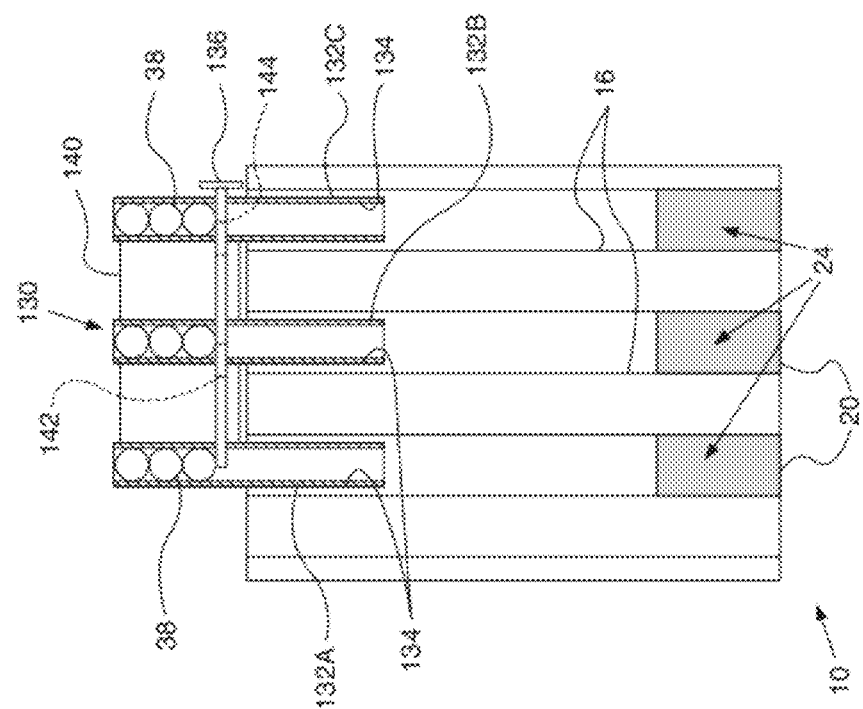

FIGS. 5 to 7 show a second embodiment of an apparatus for measuring ash deposit levels in a particulate filter comprising at least one filter cell. The filter 10 is the same as that shown in FIG. 1. As in the first embodiment, reflective indicator balls 38 may be inserted or dropped into the cells of the filter 10 manually but alternatively the balls 38 may be loaded into a dispenser 130. The dispenser 130 is similar to that of the first embodiment but is arranged so that it may simultaneously dispense balls 38 into a number of inlet or outlet cells. The dispenser has a plurality of elongate tubes 132 which are arranged in parallel with one another and connected together by a housing 140. The dispenser 130 may have any number of tubes 132 but in the illustrated embodiment there are first, second and third tubes 132A-C. Each tube 132A-C has an internal dispensing passage 134. A release member 136 is at least partially located within each passage 134 and is selectively moveable between a first position in which the reflective balls 38 are held in their respective passages 134 (as shown in FIG. 5) and a second position in which one or more of the reflective balls 138 are released from each tube 132A-C.

The release member 136 is partially located within the passage 134 of the first tube 132A, but extends all the way through the passages 134 of the second and third tubes 132B, 132C. The release member 136 is provided with release apertures 142,144 adjacent the second and third tubes 132B,132C. These apertures 142,144 are sized to allow the reflective balls 38 to pass through them but are offset from the centre axes of the second and third tubes 132B,132C when the release member 136 is in the first position. When the release member 136 is moved to the second position, the free end of the member 136 leaves the first tube 132A and the apertures 142,144 align with the centre axes of the second and third tubes 132B,132C. In this way the release member 136 simultaneously releases balls 38 in all three tubes 132A-C.

FIG. 6 schematically illustrates a second radiation source which emits radiation in order to locate the reflective balls 38 inserted into the inlet cell 16 and now lying upon the ash deposits 24 in the bottom of the cell 16. In this second illustrated embodiment, the radiation source is a laser 150 which emits radiation in the form of a beam of light. The laser 150 emits a beam of light 152 in the direction of the reflective balls 38 within the cell 16. A processor 170 is connected to a sensor 160 in order to calculate the deposit level within the cell 16 based on a reflected light beam 154.

FIG. 8 shows a third embodiment of an apparatus for measuring ash deposit levels in a particulate filter comprising at least one filter cell. The third embodiment of the apparatus includes indicator balls 238 which are inserted into the cell(s) 16 of the filter 10 so as to lie upon any ash deposits remaining in the cells 16. The apparatus also includes a radiation source in the form of a heat source, or heater, 250, and a sensor to detect the position of the balls 238 within the cell(s) 16 in the form of a thermal imaging camera 260. A processor 270 is connected to the camera 260 so that the two may communicate with one another.

INDUSTRIAL APPLICABILITY

Methods of measuring ash deposit levels in a particulate filter comprising at least one filter cell will now be described, with reference to FIGS. 1 to 8.

A first embodiment of the method will be described with reference to FIGS. 1 to 4. Firstly, the cleaned particulate filter 10 is taken and one or more of the reflective balls 38 are inserted into at least one cell 16 of the filter 10. The balls 38 may be inserted by hand or may be inserted using the dispenser 30. If the dispenser 30 is used the operator will align the tube 32 of the dispenser 30 with the cells of the filter 10 in which measurement is to take place, and may partially insert the tube 32 into the cell 16 to ensure safe dispensing of the balls 38. Pulling back the release member 36 then permits one or more balls 38 to drop out of the dispenser 30 into the cell 16.

As the balls 38 fall into the cell 16 they will contact the ash deposits 26 clinging to the walls 22 of the filter 10 and knock them off the walls 22 towards the end wall 20 of the cell 16. The balls 38 may be of a size and/or density sufficient to knock any ash deposits from the side walls 22 but that also ensures the balls 38 land upon the surface of the ash in the bottom of the cell 16, as opposed to breaking through the surface where they would be submerged or only partially exposed on the surface of the ash.

Once the balls have been inserted into the cell 16, the radiation source in the form of ultrasonic sensor, or transceiver, 40 is positioned at the open end of the cell 16 as shown in FIG. 3. To ensure consistent measurement the sensor 40 is positioned so that it abuts the inlet side 12 of the filter 10. The sensor 40 emits ultrasound waves 42 into the cell 16 in the direction of the balls 38 lying on the ash deposit layer. As shown in FIG. 4, the reflective nature of the balls 38 means that the ultrasound waves 42 are reflected by the balls 38 back towards the sensor 40 in the form of reflected waves 44. The sensor 40 detects the position of the balls 38 on the basis of the reflected waves 44, and then communicates this data to the processor 50. The processor 50 then calculates the deposit level of ash remaining in the cleaned filter 10 and displays this information to the operator. The processor will have been previously provided with stored data equating to a brand new or completely clean filter, as well as ranges of measured deposit depths which constitute acceptable and unacceptable levels of cleanliness in the filter 10. Thus, the processor 50 may indicate to the operator whether the filter 10 is sufficiently clean to return to service or else whether further cleaning is required. The indicator balls 38 are removed from the filter 10, along with any remaining ash deposits if present, prior to the filter 10 being returned into service.

A number of the steps of the second embodiment, illustrated in FIGS. 5 to 7, are similar to those of the first embodiment. Initially, the indicator balls 38 are dropped into the cells 16 of the filter 10 either by hand or by way of the dispenser 130. Where the dispenser 130 is used, the tubes 132A-C are aligned with, or partially inserted into, the cells 16. The release member 136 is then pulled out to release balls 38 from all three tubes 132A-C simultaneously. As in the first embodiment, the balls 38 knock ash deposits 26 from the walls of the cells 16 as they fall, prior to landing upon either the inside surface of the end walls 20 or upon any ash deposits lying on the end walls 20. Again, as with the first embodiment the balls 38 are of a size and/or density which means they do not penetrate through the ash but instead lie upon the surface thereof.

Once the balls 38 are in the cells 16, the laser 150 is positioned at the open end of one of the cells 16. A beam of light 152 is emitted from the laser into the cell 16 in the direction of the balls 38. The beam 152 hits one or more of the balls 38 and is reflected back up the cell 16 as reflected beam 154, where it is detected by the sensor 160. The sensor 160 communicates this detection data to the processor 170, which then calculates the deposit level of ash remaining in the cleaned filter 10 and displays this information to the operator. The processor 170 will have been previously provided with stored data equating to a brand new or completely clean filter, as well as ranges of measured deposit depths which constitute acceptable and unacceptable levels of ash in the filter 10. Thus, the processor 170 may indicate to the operator whether the filter 10 is sufficiently clean to return to service or else whether further cleaning is required. The indicator balls 38 are removed from the filter 10, along with any remaining ash deposits if present, prior to the filter 10 being returned into service.

In the third embodiment illustrated in FIG. 8, the indicator balls 238 are not reflective but are instead initially heated by a radiation source in the form of heater 250. The balls 238 are then inserted into the filter cell 16 by hand or by way of one of the dispensers 30,130 used in the first and second embodiments. As they have been heated, the balls 238 emit radiation in the form of heat into the cell once they have been inserted into the filter 10 and lie upon any ash deposits 24 remaining in the cell 16. The thermal imaging camera 260 or other heat sensing device is then positioned at a suitable reference point on the outside of the filter 10 so that it may detect the position of the heat radiating balls(s) 238. The camera 260 then communicates the positional data to the processor 270, which then calculates the ash deposit level within the cell 16 on the basis of the positional data received from the camera 260.

The processor 270 will have been previously provided with data equating to a brand new or completely clean filter, as well as ranges of measured deposit depths which constitute acceptable and unacceptable levels of ash in the filter 10. Thus, the processor 270 may indicate to the operator whether the filter 10 is sufficiently clean to return to service or else whether further cleaning is required. The indicator balls 238 are removed from the filter 10, along with any remaining ash deposits if present, prior to the filter 10 being returned into service.

The present disclosure presents a method and apparatus for measuring ash deposit levels in particulate filters which is cheaper and simpler than invasive inspection and measurement techniques, thereby reducing the cost and time of checking a cleaned filter. Furthermore, the method and apparatus of the present disclosure present clearer and more accurate measurements than existing non-invasive inspection and measurement techniques.

The third embodiment of the disclosure may be modified to present a further, fourth embodiment of method and apparatus for measuring ash levels in a particulate filter. In the modified embodiment, the heater 250 is placed on the opposite side of the filter 10 from the thermal imaging camera 260 and emits radiation in the form of heat across the filter 10 into the cells 16 in the direction of the camera 260. Unheated indicator components, such as indicator balls for example, are then inserted into the cells in a manner already described above. The position of these unheated indicator components can then be detected against the background of radiated heat emitting from the heater 250, and this positional data can then be employed by the processor 270 to calculate the deposit level in the cells 16.

It should be understood that whilst indicator dispensers 30,130 have been described with respect to the first and second embodiments, respectively, either of these dispensers may be used in any of the embodiments described herein.

The indicator balls may be sized such that their diameter is only slightly less than that of the filter cell. As a result, a plurality of balls dropped or inserted into a cell will stack on top of one another until no more balls will fit in the cell. By knowing the diameter of the balls and counting the number of balls needed to fill a cell, the depth of ash deposits left in the cell can also be measured in this manner. In the instance where a dispenser is used to insert the balls into a cell or cells, the counting of the balls could be effected by modifying the dispenser to include a counting mechanism which counts the number of balls or other indicators dispensed from the or each dispensing tube into the cells.

It will be apparent to those skilled in the art that various modifications and variations can be made to the apparatus and method. Other embodiments will be apparent to those skilled in the art from consideration of the specification and practice of the disclosed apparatus and method. It is intended that the specification and examples be considered as exemplary only, with a true scope being indicated by the following claims and their equivalents.

What is claimed is:

1. An apparatus for measuring ash deposit levels in a particulate filter comprising at least one cell, the apparatus comprising:
    a radiation source for emitting radiation into the at least one filter cell;
    one or more indicator components insertable into the at least one filter cell;
    at least one radiation detection sensor which detects the position of the one or more indicator components on the basis of the emitted radiation; and
    a processor which calculates an ash deposit level in the at least one filter cell on the basis of the detected position of the indicator components.

2. The apparatus of claim 1, wherein the indicator components are balls, each ball having a diameter of between 0.6 mm and 1.4 mm.

3. The apparatus of claim 2, wherein the one or more balls are hollow.

4. The apparatus of claim 1, wherein the radiation source emits radiation into the at least one filter cell, and the one or more indicator components are radiation reflecting components which reflect radiation emitted from the radiation source, and wherein the at least one radiation detection sensor detects radiation reflected from the one or more radiation reflecting components.

5. The apparatus of claim 4, wherein the one or more radiation reflecting components is formed from a reflective material.

6. The apparatus of claim 4, wherein the one or more radiation reflecting components is coated with a reflective material.

7. The apparatus of claim 1, wherein the radiation source is a heat source which heats the indicator components prior to their insertion into the at least one filter cell, and wherein the indicator components emit heat into the cell.

8. The apparatus of claim 2, further comprising a dispenser containing the one or more balls for insertion into the at least one filter cell.

9. The apparatus of claim 8, wherein the dispenser comprises an elongate tube in which the one or more balls are located, and a release member moveable between a first position in which the balls are held in the dispenser and a second position in which one or more of the balls are released from the dispenser into one or more cells.

10. The apparatus of claim 8, wherein the dispenser comprises a plurality of elongate tubes arranged in parallel with one another with each elongate tube containing one or more of the balls, and a release member moveable between a first position in which the balls are held in the tubes and a second position in which one or more of the balls are released from each tube into a number of cells.

11. The apparatus of claim 4, wherein the radiation source is an ultrasonic transmitter emitting radiation in the form of ultrasound waves.

12. The apparatus of claim 4, wherein the radiation source is a laser emitting radiation in the form of a beam of light.

* * * * *